US011174196B2

(12) United States Patent
Mariani et al.

(10) Patent No.: US 11,174,196 B2
(45) Date of Patent: Nov. 16, 2021

(54) MATERIAL COMPRISING A SINGLE FUNCTIONAL LAYER CONTAINING SILVER AND AN ABSORBENT LAYER (71) Applicant: SAINT-GOBAIN GLASS FRANCE, Courbevoie (FR)

(72) Inventors: Silvia Mariani, Le Pre Saint-Gervais (FR); Cécile Delbecq, Paris (FR); Vincent Chery, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 58 days.

(21) Appl. No.: 16/765,336

(22) PCT Filed: Nov. 19, 2018

(86) PCT No.: PCT/FR2018/052904
§ 371 (c)(1),
(2) Date: May 19, 2020

(87) PCT Pub. No.: WO2019/097192
PCT Pub. Date: May 23, 2019

(65) Prior Publication Data
US 2020/0354266 A1 Nov. 12, 2020

(30) Foreign Application Priority Data
Nov. 20, 2017 (FR) ...................................... 1760922

(51) Int. Cl.
*B32B 15/04* (2006.01)
*C03C 17/36* (2006.01)
(52) U.S. Cl.
CPC ........ *C03C 17/366* (2013.01); *C03C 17/3613* (2013.01); *C03C 17/3626* (2013.01);
(Continued)

(58) Field of Classification Search
CPC .......................... C03C 17/366; C03C 17/3613
(Continued)

(56) References Cited

U.S. PATENT DOCUMENTS

2011/0261442 A1* 10/2011 Knoll .................... C03C 17/366
359/360
2011/0262726 A1* 10/2011 Knoll .................. C03C 17/3626
428/213
(Continued)

FOREIGN PATENT DOCUMENTS

GB           2 080 339 A    2/1982
WO    WO 2010/072973 A1    7/2010
(Continued)

OTHER PUBLICATIONS

International Search Report as issued in International Patent Application No. PCT/FR2018/052904, dated Mar. 8, 2019.

*Primary Examiner* — Lauren R Colgan
(74) *Attorney, Agent, or Firm* — Pillsbury Winthrop Shaw Pittman LLP (57) ABSTRACT

A material includes a transparent substrate coated with a stack of thin layers I including a lower coating including at least one absorbent layer, a single silver-based functional metal layer and an upper coating including at least one dielectric layer. The absorbent layer is separated from the substrate and from the functional layer by one or more dielectric layers. The material, once fitted in a double glazing, makes it possible to obtain a high selectivity, in particular of greater than 1.45, an interior and exterior light reflection of less than 25% and bluish hues in exterior reflection and in interior reflection.

15 Claims, 3 Drawing Sheets

(52) U.S. Cl.
CPC ...... *C03C 17/3642* (2013.01); *C03C 17/3644* (2013.01); *C03C 17/3649* (2013.01); *C03C 17/3681* (2013.01); *C03C 2217/212* (2013.01); *C03C 2217/216* (2013.01); *C03C 2217/22* (2013.01); *C03C 2217/23* (2013.01); *C03C 2217/256* (2013.01); *C03C 2217/261* (2013.01); *C03C 2217/281* (2013.01); *C03C 2218/156* (2013.01)

(58) Field of Classification Search
USPC .............................. 428/426, 428, 432, 434
See application file for complete search history.

(56) References Cited

U.S. PATENT DOCUMENTS

| | | | | |
|---|---|---|---|---|
| 2011/0305853 | A1* | 12/2011 | Reymond | C03C 17/36 428/34 |
| 2015/0247961 | A1* | 9/2015 | Jribi | C03C 17/3681 359/360 |
| 2017/0198518 | A1* | 7/2017 | Caillet | C03C 17/3644 |

FOREIGN PATENT DOCUMENTS

| | | |
|---|---|---|
| WO | WO 2010/072974 A1 | 7/2010 |
| WO | WO 2013/045512 A2 | 4/2013 |
| WO | WO 2014/044984 A1 | 3/2014 |

\* cited by examiner

MATERIAL COMPRISING A SINGLE FUNCTIONAL LAYER CONTAINING SILVER AND AN ABSORBENT LAYER

CROSS-REFERENCE TO RELATED APPLICATIONS

This application is the U.S. National Stage of PCT/FR2018/052904, filed Nov. 19, 2018, which in turn claims priority to French patent application number 1760922 filed Nov. 20, 2017. The content of these applications are incorporated herein by reference in their entireties.

The invention relates to a material comprising a transparent substrate coated with a stack of thin layers comprising a single silver-based functional metal layer and an absorbent layer. The invention also relates to a glazing comprising the material.

Silver-based functional metal layers (or silver layers) have advantageous properties of electrical conduction and of reflection of infrared (IR) radiation, hence their use in "solar control" glazings, targeted at reducing the amount of incoming solar energy, and/or in "low-emissivity" glazings, targeted at reducing the amount of energy dissipated toward the outside of a building or of a vehicle.

These silver layers are deposited between coatings based on dielectric materials generally comprising several dielectric layers (hereinafter dielectric coatings) making it possible to adjust the optical properties of the stack. These dielectric layers additionally make it possible to protect the silver layer from chemical or mechanical attacks.

In countries where the levels of exposure to sunlight are high, low-emissivity glazings for "residential" applications also have to exhibit the solar control effect.

In order to achieve this objective, one solution consists in increasing the thickness of the silver-based functional metal layer until the desired level of energy transmission is obtained. Nevertheless, this results in an increase in the light reflection up to levels regarded as esthetically undesirable, in particular of greater than 25% or even 27%.

In order to overcome this disadvantage, another solution proposed consists in introducing absorbent material in the form of an absorbent layer into the stack. The targeted objective is to reduce the energy transmission while limiting the increase in the light reflection to an acceptable level.

Several documents disclose the use of absorbent layers in stacks comprising several functional layers. The complexity of these stacks does not make it possible to adapt the teaching of these documents for the design of a stack having a single functional layer.

There also exist documents disclosing stacks of thin layers comprising a single functional layer and one or more absorbent layers. The introduction of these absorbent layers makes it possible to reduce the light reflection. However, none of the solutions disclosed in these documents is entirely satisfactory.

The invention is concerned specifically with developing a material comprising a stack having a single silver-based functional layer; the material, once fitted in a double glazing, makes it possible to obtain:
- a high selectivity, in particular of greater than 1.45,
- an interior and exterior light reflection of less than 25%, preferably of between 15% and 25%,
- bluish hues in exterior reflection,
- bluish hues in interior reflection,
- non-yellow hues in transmission, preferably hues as neutral as possible.

To obtain bluish hues in interior and exterior reflection is an essential objective of the invention.

The selectivity "S" correspond to the ratio of the light transmission $LT_{vis}$ in the visible region of the glazing to the solar factor SF of the glazing ($S=LT_{vis}/SF$). The solar factor "SF" corresponds to the ratio in % of the total energy entering the premises through the glazing to the incident solar energy.

All the light characteristics described are obtained according to the principles and methods of the European standard EN 410 relating to the determination of the light and solar characteristics of the glazings used in the glass for the construction industry.

The properties, such as selectivity, the exterior or interior light reflection and the colorimetric properties, are calculated with:
- materials comprising a substrate coated with a stack having a single functional layer fitted in a double glazing,
- the double glazing has a configuration: 4-16(Ar-90%)-4, that is to say a configuration consisting of a material comprising one substrate and of another substrate of glass of 4 mm, the two substrates are separated by an inserted gas-filled cavity comprising 90% of argon and 10% of air with a thickness of 16 mm,
- the stack is positioned on face 2.

A glazing for the construction industry generally delimits two spaces: a space described as "exterior" and a space described as "interior". It is considered that the sunlight entering a building goes from the exterior toward the interior. The stack is either located:
- on face 2, that is to say on the outermost substrate of the building, on its face turned toward the inserted gas-filled cavity,
- on face 3, that is to say on the innermost substrate of the building, on its face turned toward the inserted gas-filled cavity, According to the invention, the light characteristics are measured according to the D65 illuminant at 2° perpendicularly to the material fitted in a double glazing:
- LT corresponds to the light transmission in the visible region in %,
- Rext corresponds to the exterior light reflection in the visible region in %, with the observer on the exterior space side,
- Rint corresponds to the interior light reflection in the visible region in %, with the observer on the interior space side,
- a*T and b*T correspond to the colors in transmission a* and b* in the L*a*b* system,
- a*Rext and b*Rext correspond to the colors in reflection a* and b* in the L*a*b* system, the observer on the exterior space side,
- a*Rint and b*Rint correspond to the colors in reflection a* and b* in the L*a*b* system, the observer on the interior space side, According to the invention:
- bluish hues in exterior reflection are defined by b*Rext values of less than −5, indeed even −6, and better still −8 and optionally a*Rext values which are positive and less than 5, indeed even than 3,
- bluish hues in interior reflection are defined by b*Rint values of less than −5, indeed even −6, and better still −8 and optionally a*Rint values which are positive and less than 5, indeed even than 3, non-yellow hues in transmission, which are preferably as neutral as possible, are defined by b*T values of less than 6.

The solutions developed in the prior art, in particular in the applications WO 2010/072973, WO 2010/072974 and WO 2014/044984, exhibit:
- an excessively low selectivity, while conventionally glazings comprising stacks comprising a single functional layer not comprising an absorbent layer can exhibit a selectivity of approximately 1.5, and/or
- an excessively high interior and/or exterior light reflection, in particular of greater than 25%,
- hues other than bluish in interior and exterior reflection (b*Rext and b*Rint greater than −4) or yellow in transmission (b*T greater than 6).

The aim of the invention is to succeed in overcoming the disadvantages of the prior art, by developing a novel type of stack comprising a single functional layer, which stack confers, on the double glazing incorporating it, a high selectivity, in particular of greater than 1.45, indeed even of greater than 1.5, a light reflection on the exterior and interior side of less than 25%, and a color which is relatively neutral in transmission and blue in reflection on the exterior side and interior side.

The invention relates to a material comprising a transparent substrate coated with a stack of thin layers comprising, starting from the substrate:
- a lower coating comprising:
  - at least one dielectric layer,
  - at least one absorbent layer exhibiting a thickness of between 0.2 and 9 nm,
  - at least one dielectric layer,
- a single silver-based functional metal layer,
- optionally a blocking layer,
- an upper coating comprising at least one dielectric layer,
- optionally a protective layer, characterized in that:
- the absorbent layer is separated from the substrate and from the functional layer by one or more dielectric layers,
- the thickness of all the dielectric layers interposed between the absorbent layer and the functional metal layer is between 3 and 18 nm.

The absorbent layer absorbs solar radiation in the visible part of the spectrum.

The invention also relates to a multiple glazing comprising at least one material according to the invention and at least one second substrate, the material and the second substrate are separated by at least one inserted gas-filled cavity. Preferably, the stack is positioned on face 2.

When the material is fitted in a double glazing with the stack positioned on face 2, the double glazing exhibits:
- a selectivity of greater than 1.45,
- an interior and exterior light reflection of less than 25%,
- a value of b* in exterior reflection (b*Rext) of less than −5,
- a value of b* in interior reflection (b*Rint) of less than −5.

The objectives of the invention can be converted into absorption properties. The objectives are:
- a high selectivity, that is to say a low solar factor and high light transmission,
- a low light reflection,
- modifications which must not bring about an undesirable shift:
  - of the color in transmission toward yellow,
  - of the color in reflection toward the red.

In transmission, the following are desired:
- a high absorption of the red part of the visible spectrum and of the infrared radiation, that is to say a high absorption of the wavelengths starting from 600 nm, and
- a low absorption in the remainder of the visible spectrum in order to maintain a high light transmission.

In reflection, the following are desired:
- a high absorption, in particular of the red part of the visible spectrum,
- a moderate absorption of the blue-green part of the visible spectrum, that is to say of the wavelengths of approximately 450 nm.

The light energy absorption in a stack of thin layers, attributable to the presence of an absorbent layer, depends both on the nature of the absorbent layer, the thickness and material constituting it, but also on the position where the absorbent layer is located in the stack.

The local amplitude of the electric field at a layer of the stack depends on its position in the stack, which operates as an interference filter. The light energy absorption varies proportionally with respect to the amplitude of this electric field.

If the absorbent layer is placed at a spot of the stack where the amplitude of the electric field for a given wavelength is high, the absorption of this wavelength will be greater in comparison with a stack comprising the same absorbent layer placed at a spot where the amplitude of the electric field is lower.

Figure 1:
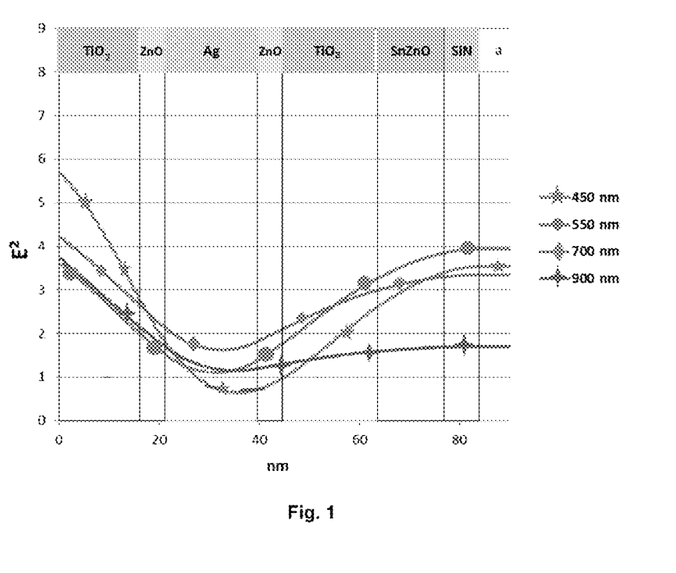

FIG. 1 illustrates the variations in amplitude of the electric field ($E^2$ in arbitrary unit), at different wavelengths, as a function of the distance from the substrate (in nm), for a typical stack, the sequence of layers of which starting from the substrate is described on the upper abscissa. The wavelengths chosen respectively illustrate:
- 450 nm: the chromatic field of the blue,
- 550 nm: the chromatic field of the green,
- 700 nm: the chromatic field of the red,
- 900 nm: the IR radiation.

The following observations may be made:
- close to the substrate, the amplitude of the electric field for a wavelength of 450 nm is high and relatively much higher than the amplitude of the electric field for a wavelength at 700 nm,
- close to and below the silver layer, the amplitude of the electric field for a wavelength of 450 nm, of 550 nm and of 700 nm is of the same order of magnitude.

The applicant has thus demonstrated that, in a stack comprising a single silver layer, the intensity of the electric field for the short wavelengths of the visible region corresponding to the blue is particularly high close to the substrate and very significantly decreases as the silver layer is approached. These short wavelengths are of the order of 400 to 450 nm.

The applicant thus shows that it is possible to selectively increase or reduce the absorption properties of the stack for certain wavelengths. For this, it is possible to advantageously select the position of the absorbent layer by placing it at a spot of the stack where the amplitude of the electric field for this wavelength is high or low.

Surprisingly, by configuring the stack in order to selectively:
- not significantly absorb the short wavelengths corresponding to the color blue, but
- promote the absorption of the other wavelengths, a material is obtained which simultaneously exhibits:
- the desired hue in reflection, namely a bluish hue,
- a low reflection on the exterior and interior side, a high selectivity.

However, the absorbent layer is advantageously separated from the functional metal layer by one or more dielectric layers in order to prevent any damage to the functional layer or to the absorbent layer.

The solution of the invention thus consists in positioning an absorbent layer at a very precise spot in a stack comprising a single functional metal layer. To position the absorbent layer close to the functional layer makes it possible:
- to absorb as little as possible of blue light in order to obtain a bluish hue in reflection,
- to avoid producing an excessively yellow hue in transmission,
- to prevent any deterioration in the functional layer or in the absorbent layer.

The invention also relates to:
- the glazing comprising at least one material according to the invention,
- the process for the preparation of a material according to the invention,
- the use of a glazing according to the invention as solar control glazing for the construction industry or vehicles,
- a building or a vehicle comprising a glazing according to the invention.

In a double glazing configuration, the present invention makes it possible to obtain a high selectivity S, in particular of greater than 1.45, indeed even of greater than 1.5, a solar factor (SF) of less than 45%, neutral colors in transmission and a bluish appearance in exterior and interior reflection.

The material used in double glazing can additionally exhibit the following characteristics:
- a selectivity of greater than 1.50,
- a light transmission, by increasing order of preference, of greater than or equal to 50%, of greater than or equal to 55%, of greater than or equal to 60%, of between 50% and 70%,
- a solar factor, by increasing order of preference, of less than 45%, 44%, 43%,
- an exterior reflection, by increasing order of preference, of less than 24%, of less than 22%, or of between 20% and 23%,
- an interior reflection, by increasing order of preference, of less than 24%, of less than 22%, of less than 21%, or of between 18% and 21%.

The preferred characteristics which appear in the continuation of the description are applicable both to the material according to the invention and, if appropriate, to the glazing or to the process according to the invention.

The stack is deposited by magnetic-field-assisted cathode sputtering (magnetron process). According to this advantageous embodiment, all the layers of the stack are deposited by magnetic-field-assisted cathode sputtering.

Unless otherwise indicated, the thicknesses mentioned in the present document are physical thicknesses and the layers are thin layers. Thin layer is understood to mean a layer exhibiting a thickness of between 0.1 nm and 100 micrometers.

"Absorbent layer", within the meaning of the present invention, is understood to mean a layer made of a material exhibiting an n/k ratio over the entire wavelength range of the visible region (from 380 nm to 780 nm) between 0 and 5, these values being excluded, and exhibiting an electrical resistivity in the bulk state (as known in the literature) of greater than $10^{-6}$ Ω.cm. n denotes the real refractive index of the material at a given wavelength and k represents the imaginary part of the refractive index at a given wavelength; the n/k ratio being calculated at an identical given wavelength for n and for k.

Preferably, the light absorption, and thus the absorption of the solar radiation in the visible part of the spectrum, due to the absorbent layer, measured by depositing only this absorbent layer enclosed between its two dielectric layers on ordinary clear glass with a thickness of 4 mm, measured on the glass side, is between 5% and 45%, preferably between 10% and 35%.

The absorbent layer is chosen from:
- metal layers based on a metal or on a metal alloy,
- metal nitride layers and
- metal oxynitride layers, of one or more elements chosen from palladium, niobium, tungsten, stainless steel, titanium, chromium, molybdenum, zirconium, nickel, tantalum or zinc.

The solar absorbent layer can be essentially in the metallic form. Although essentially in the metallic form, the metal can exhibit traces of nitridation due to the deposition atmosphere contaminated by nitrogen from the neighbouring deposition zones. Preferably, the absorbent layer is a metal chosen from palladium, niobium, tungsten, stainless steel, titanium, chromium, molybdenum, zirconium, nickel, tantalum, zinc or alloys, such as NiCr, NiCrW, WTa, WCr, NbZr, TaNiV, CrZr and NbCr.

The absorbent layer can be a nitride or a subnitride, that is to say a nitride substoichiometric in nitrogen. Preferably, the layer which absorbs the solar radiation is a nitride chosen from TiN, NiCrWN, NiVN, TaN, CrN, ZrN, CrZrN, TiAlN, TiZrN, WN, SiZrN and SiNiCrN.

Advantageously, the absorbent layer can be chosen from the layers based on Ti, TiN, Nb, NbN, Ni, NiN, Cr, CrN, NiCr or NiCrN.

According to the preferred embodiments, the absorbent layer is a layer of titanium nitride TiN or a metal layer of alloy of nickel and of chromium NiCr.

Preferably, the stack comprises a single absorbent layer. This means in particular that the upper coating does not comprise an absorbent layer.

The thickness of the absorbent layer is, by increasing order of preference, from 0.2 to 9 nm, from 0.3 to 5 nm, from 0.35 to 3 nm, from 0.35 to 0.45 nm.

The thickness of all the layers interposed between the absorbent layer and the functional layer is, by increasing order of preference:
- greater than 3 nm, greater than 4 nm, greater than 5 nm, or
- less than 18 nm, less than 17 nm, less than 16 nm, less than 1 nm, less than 14 nm, less than 13 nm, less than 12 nm, less than 11 nm, less than 10 nm, or
- of between 3 and 18 nm, of between 3 and 15 nm, of between 3 and 10 nm.

The thickness of all the layers interposed between the absorbent layer and the substrate is, by increasing order of preference:
- greater than 11 nm, greater than 12 nm, greater than 13 nm, greater than 14 nm, greater than 15 nm, greater than 16 nm, greater than 17 nm, greater than 18 nm,
- of between 11 and 30 nm, of between 12 and 25 nm, of between 15 and 20 nm.

According to the invention, the stack comprises a single silver-based functional metal layer. This type of stack is also denoted "functional monolayer stack". This means that the stack does not comprise another silver-based functional layer.

A silver-based functional metal layer comprises at least 95.0%, preferably at least 96.5% and better still at least 98.0% by weight of silver, with respect to the weight of the functional layer. Preferably, the silver-based functional metal layer comprises less than 1.0% by weight of metals other than silver, with respect to the weight of the silver-based functional metal layer.

The silver-based functional metal layer can also comprise doping elements chosen, for example, from copper, palladium, gold or platinum. Preferably, each of these doping elements represents less than 15%, less than 10%, less than 5%, less than 1%, less than 0.5%, by weight of the silver-based functional metal layer. The maximum proportions of doping element depend on the nature of the doping element.

Preferably, the silver-based functional metal layer comprises less than 5%, preferably less than 1.0%, indeed even less than 0.5%, by weight of doping elements.

The thickness of the silver-based functional layer is, by increasing order of preference, from 5 to 25 nm, from 10 to 20 nm, from 12 to 19 nm, from 14 to 18 nm.

The silver-based functional metal layer can be protected by a layer described as blocking layer. According to this embodiment, the stack of thin layers additionally comprises at least one blocking layer located in contact with and above the functional metal layer.

The blocking layers are chosen from metal layers based on a metal or on a metal alloy, metal nitride layers, metal oxide layers and metal oxynitride layers of one or more elements chosen from titanium, nickel, chromium, tantalum and niobium, such as Ti, TiN, $TiO_x$, Nb, NbN, Ni, NiN, Cr, CrN, NiCr or NiCrN. When these blocking layers are deposited in the metal, nitride or oxynitride form, these layers can undergo a partial or complete oxidation according to their thickness and the nature of the layers which frame them, for example, during the deposition of the following layer or by oxidation in contact with the underlying layer.

The blocking layers are preferably chosen from metal layers, in particular layers of an alloy of nickel and of chromium (NiCr) or of titanium.

Each blocking layer exhibits a thickness of between 0.1 and 2.0 nm. The thickness of these blocking layers is, by increasing order of preference:
of at least 0.1 nm, of at least 0.2 nm, and/or
of at most 2.0 nm, of at most 1 nm.

The blocking layers, although deposited in metal form and presented as being metal layers, are in practice oxidized layers since their basic function is to oxidize during the deposition of the stack in order to protect the functional layer. According to the invention, the blocking layers are not absorbent layers.

The stack of thin layers comprises at least one functional layer and at least two coatings comprising at least one dielectric layer, so that each functional layer is positioned between two coatings.

The stack is located on at least one of the faces of the transparent substrate.

"Coating" within the meaning of the present invention should be understood as meaning that there may be a single layer or several layers of different materials within the coating.

The thickness of a lower or upper coating corresponds to the sum of the thicknesses of the layers constituting it.

The lower and upper coatings exhibit a thickness of greater than 15 nm, preferably of between 15 and 100 nm, 20 and 70 nm and better still between 30 and 60 nm.

These coatings have, by increasing order of preference, a thickness:
of less than or equal to 100 nm, of less than or equal to 80 nm, of less than or equal to 60 nm, and/or
of greater than or equal to 15 nm, of greater than or equal to 20 nm.

"Dielectric layer", within the meaning of the present invention, should be understood as meaning that, from the viewpoint of its nature, the material is "nonmetallic", that is to say is not a metal. In the context of the invention, this term denotes a material exhibiting an n/k ratio over the entire wavelength range of the visible region (from 380 nm to 780 nm) equal to or greater than 5.

The dielectric layers of the coatings exhibit the following characteristics, alone or in combination:
they are deposited by magnetic-field-assisted cathode sputtering,
they are chosen from the oxides or nitrides of one or more elements chosen from titanium, silicon, aluminum, zirconium, tin and zinc,
they have a thickness of greater than 2 nm, preferably of between 2 and 100 nm.

The dielectric layers can be layers described as wetting layers. Wetting layer is understood to mean a layer made of a material capable of stabilizing the interface with the functional layer. These wetting layers are generally based on zinc oxide.

The zinc oxide layer can optionally be doped using at least one other element, such as aluminum. The zinc oxide is crystalline. The layer based on zinc oxide comprises, by increasing order of preference, at least 90.0%, at least 92%, at least 95%, at least 98.0%, by weight of zinc, with respect to the weight of elements other than oxygen in the layer based on zinc oxide.

Preferably, the lower coating comprises a dielectric layer based on zinc oxide located directly in contact with the silver-based metal layer. This dielectric layer based on zinc oxide can be located directly in contact with the absorbent layer.

The zinc oxide layers have, by increasing order of preference, a thickness:
of at least 3.0 nm, of at least 4.0 nm, of at least 5.0 nm, and/or
of at most 25 nm, of at most 10 nm, of at most 8.0 nm.

The dielectric layers can exhibit a barrier function. Dielectric layers having a barrier function (hereinafter barrier layer) is understood to mean a layer made of a material capable of forming a barrier to the diffusion of oxygen and water at high temperature, originating from the ambient atmosphere or from the transparent substrate, toward the functional layer. Such dielectric layers are chosen from the layers:
based on silicon and/or aluminum compounds chosen from oxides, such as $SiO_2$, nitrides, such as silicon nitride $Si_3N_4$ and aluminum nitrides AlN, and oxynitrides $SiO_xN_y$, optionally doped using at least one other element,
based on zinc tin oxide,
based on titanium oxide.

Preferably, each coating comprises at least one dielectric layer consisting:
of an aluminum and/or silicon nitride or oxynitride, or
of a mixed zinc tin oxide, or
of a titanium oxide.

These dielectric layers have, by increasing order of preference, a thickness:
of less than or equal to 40 nm, of less than or equal to 30 nm, of less than or equal to 25 nm, and/or of greater than or equal to 5 nm, of greater than or equal to 10 nm or of greater than or equal to 15 nm.

The dielectric layers can also be chosen as a function of their refractive index.

According to one embodiment, the lower coating and/or the upper coating comprises at least one high-index layer based on metal oxide exhibiting a refractive index of greater than 2.20, preferably of between 2.3 and 2.7, and a thickness of greater than 5 nm.

Preferably, the lower coating comprises at least one high-index layer in contact with the substrate.

Preferably, the lower coating comprises at least one high-index layer in contact with the absorbent layer.

The refractive index values shown in the present document are the values measured as is usual at the wavelength of 550 nm. These high-index layers preferably exhibit a physical thickness of between 10 and 20 nm. This high-index layer makes it possible to maximize the high light transmission in the visible region of the stack and has a favorable effect on neutral colors being obtained, both in transmission and in reflection.

Such high-index layers based on metal oxide are chosen from such as titanium oxide or niobium oxide layers or layers of an alloy obtained from titanium and niobium.

According to a particularly advantageous embodiment, the lower coating comprises at least the sequence of layers deposited in the following order:
- at least one layer having a high refractive index, made of material with a refractive index of greater than or equal to 2.20, the physical thickness of the layer having a high refractive index or the sum of the physical thicknesses of the layers having a high refractive index being between 10 and 40 nm,
- at least one absorbent layer,
- at least one zinc oxide layer.

According to a particularly advantageous embodiment, the upper coating comprises at least the sequence of thin layers deposited in the following order above the functional layer:
- at least one blocking layer,
- at least one layer based on zinc oxide,
- at least one layer having a high refractive index, made of material with a refractive index of greater than or equal to 2.20, the physical thickness of the layer having a high refractive index or the sum of the physical thicknesses of the layers having a high refractive index being between 10 and 40 nm,
- at least one dielectric layer exhibiting a refractive index of less than 2.20 and a thickness of greater than 5 nm located above the high-index layer.

The stack of thin layers can optionally comprise a protective layer. The protective layer is preferably the final layer of the stack, that is to say the layer furthest from the substrate coated with the stack (before heat treatment). These layers generally have a thickness of between 0.5 and 10 nm, preferably 1 and 5 nm. This protective layer can be chosen from a layer of titanium, of zirconium, of hafnium, of silicon, of zinc and/or of tin, this or these metals being in the metal, oxide or nitride form.

According to one embodiment, the protective layer is based on zirconium and/or titanium oxide, preferably based on zirconium oxide, on titanium oxide or on titanium zirconium oxide.

The transparent substrates according to the invention are preferably made of a rigid inorganic material, such as made of glass, or are organic, based on polymers (or made of polymer).

The transparent organic substrates according to the invention, which are rigid or flexible, can also be made of polymer. Examples of polymers suitable according to the invention comprise in particular:
- polyethylene;
- polyesters, such as polyethylene terephthalate (PET), polybutylene terephthalate (PBT) or polyethylene naphthalate (PEN);
- polyacrylates, such as polymethyl methacrylate (PMMA);
- polycarbonates;
- polyurethanes;
- polyamides;
- polyimides;
- fluoropolymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
- photocrosslinkable and/or photopolymerizable resins, such as thiolene, polyurethane, urethane-acrylate or polyester-acrylate resins; and
- polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or aluminoborosilicate type.

According to a preferred embodiment, the substrate is made of glass, in particular soda-lime-silica glass, or of a polymeric organic substance.

The substrate advantageously has at least one dimension greater than or equal to 1 m, indeed even 2 m and even 3 m. The thickness of the substrate generally varies between 0.5 mm and 19 mm, preferably between 0.7 and 9 mm, in particular between 2 and 8 mm, indeed even between 4 and 6 mm. The substrate can be flat or bent, indeed even flexible.

The invention also relates to a process for the preparation of a material comprising a transparent substrate coated with a stack of thin layers deposited by cathode sputtering, optionally magnetic-field-assisted cathode sputtering, the process comprises the sequence of following stages:
- at least one lower coating comprising an absorbent layer located between two dielectric layers is deposited on the transparent substrate,
- a silver-based functional layer is deposited, then
- an upper coating is deposited above the functional layer.

The invention also relates to a glazing comprising at least one material according to the invention. The glazing can be in the form of a monolithic glazing or single glazing, of a laminated glazing or of a multiple glazing.

A monolithic glazing comprises 2 faces; face 1 is outside the building and thus constitutes the exterior wall of the glazing and face 2 is inside the building and thus constitutes the interior wall of the glazing.

A double glazing comprises 4 faces; face 1 is outside the building and thus constitutes the exterior wall of the glazing and face 4 is inside the building and thus constitutes the interior wall of the glazing, faces 2 and 3 being inside the double glazing.

The glazing is preferably chosen from multiple glazings, in particular a double glazing or a triple glazing, comprising at least one material according to the invention and at least one second substrate, the material and the second substrate are separated by at least one inserted glass-filled cavity, the said glazing producing a separation between an exterior space and an interior space.

These glazings advantageously exhibit:
a light reflection, on the interior and exterior side, of less than 24%, and/or
a neutral color in transmission with a b*T of less than 6, and/or
a blue color in reflection with a b*Rext and a b*Rint of less than −6 and optionally an a*Rext and an a*Rint of less than 5.

These glazings are fitted to a building or a vehicle.

The stack is positioned in the glazing, preferably on face 2, so that the incident light originating from the outside passes through the lower dielectric coating before passing through the functional metal layer.

The following examples illustrate the invention.

EXAMPLES

I. Preparation of the Substrates: Stacks, Deposition Conditions

Stacks of thin layers defined below are deposited on substrates made of clear soda-lime glass with a thickness of 4 mm.

In the examples of the invention:
the functional layers are silver (Ag) layers,
the absorbent layers are made of alloy of nickel and of chromium (NiCr) or made of titanium nitride (TiN),
the blocking layers are metal layers made of alloy of nickel and of chromium (NiCr),
the dielectric layers are based on silicon nitride, doped with aluminum ($Si_3N_4$: Al), on zinc oxide (ZnO), on zinc tin oxide (SnZnO) or on titanium oxide ($TiO_2$).

The conditions for deposition of the layers, which were deposited by sputtering ("magnetron cathode" sputtering), are summarized in table 1.

TABLE 1

|  | Target employed | Deposition pressure | Gas |
|---|---|---|---|
| Ag | Ag | $3 \times 10^{-3}$ mbar | 100% Ar |
| NiCr | Ni (80 at. %)::Cr (20 at. %) | $2\text{-}3 \times 10^{-3}$ mbar | 100% Ar |
| TiN | Ti | $2.4 \times 10^{-3}$ mbar | 82% $Ar/(Ar + N_2)$ |
| Ti | Ti | $7 \times 10^{-3}$ mbar | 100% Ar |
| $TiO_2$ | $TiO_x$ | $2 \times 10^{-3}$ mbar | 90% $Ar/(Ar + O_2)$ |
| $Si_3N_4$ | Si:AL at 92:8% by weight | $3.2 \times 10^{-3}$ mbar | 55% $Ar/(Ar + N_2)$ |
| SnZnO | Sn 47.2 Zn 52.8 | $4.6 \times 10^{-3}$ mbar | 64% $Ar/(Ar + O_2)$ |
| $TiO_2$—TiZrO | $TiO_x$75.5—$ZrO_2$ 24.3 mol % | $4.8 \times 10^{-3}$ mbar | 96% $Ar/(Ar + O_2)$ |
| ZnO | Zn:AL at 98:2% by weight | $1.8 \times 10^{-3}$ mbar | 63% $Ar/(Ar + O_2)$ |

At. = atomic

II. Parameters Influencing the Absorption

Several experiments were carried out in order:
to demonstrate the influence of the position of the absorbent layer on the absorption and
to prove that the position chosen makes it possible to obtain the desired colorimetric properties, namely the bluish appearance in reflection.

The ability to absorb a wavelength is proportional:
to the square of the intensity of the electric field generated at a point of the stack at this wavelength,
to the spectral dependence.

II.1. The Spectral Dependence

The spectral dependence depends on the material (intrinsic nature) and on the wavelength. From the viewpoint of this parameter, the criteria selected to determine the absorbent materials are as follows:

a weak absorption of the events corresponding to the blue,
a strong absorption of the other wavelengths and in particular of those corresponding to the yellow.

The most satisfactory materials with respect to this parameter are the nickel and chromium metal layers and the titanium nitride layers.

II.2. Determination of the Favored Position: Evaluation of the Amplitude of the Electric Field The dependence between the amplitude of the electric field and the position of the absorbent layer is illustrated by FIG. 1. This figure represents the amplitude of the electric field ($E^2$ in arbitrary unit), at different lengths, as a function of the distance from the substrate (in nm), for a typical stack, the sequence of layers of which starting from the substrate is described on the upper abscissa.

The typical stack comprises, starting from the substrate, the sequence of following layers: $TiO_2$/ZnO/Ag/ZnO/$TiO_2$/SnZnO/SiN/a (Air).

By virtue of appropriate software, it is possible to determine, for each wavelength, the square of the electric yield as a function of the distance with respect to the substrate. The wavelengths chosen respectively illustrate:
450 nm: the chromatic field of the blue,
550 nm: the chromatic field of the green,
700 nm: the chromatic field of the red,
900 nm: the IR radiation.

The following are found:
on the lower abscissa: the distance with respect to the substrate (in nm) representing the position in the stack with 0 nm representing the surface of the substrate on which the stack is deposited,
on the upper abscissa, the nature of the layers and their thicknesses; for example, the first $TiO_2$ layer in contact with the substrate has a thickness of approximately 15 nm and the ZnO layer under the silver a thickness of approximately 5 nm,
on the ordinate, the amplitude of the square of the electric field ($E^2$ in arbitrary unit).

Knowing that the absorption is proportional to the amplitude of the electric field, the following observations may be made.

The electric field is minimum for all the wavelengths at the silver layer as the stacks are optimized for minimizing the absorption in the silver layer. A high light transmission LT is thus obtained.

The absorption (all wavelengths joined) is less effective if the absorbent layer is placed close to the silver layer. This means that, if the absorbent layer is placed close to the silver layer, a greater thickness will be necessary in order to achieve the level of absorption which would be obtained if the absorbent layer were placed close to the substrate.

The absorption in the blue part of the spectrum is minimal close to the silver layer. Placing the absorber at this position makes it possible to prevent bringing about a shift in color toward the yellow.

Close to the substrate, the absorption in the blue part of the spectrum (approximately 450 nm) is high and the absorption in the red part of the spectrum is relatively lower (approximately 700 nm).

Close to and below the silver layer, the absorption is of the same order of magnitude for all the wavelengths of the visible region (450 nm, 550 nm and 700 nm). Consequently, by placing the absorbent layer at this position with respect to the substrate, more red than blue is selectively absorbed. The selectivity for absorption of the red with respect to the blue is better. This makes it possible to prevent a shift in the colors toward the red.

The applicant thus demonstrates that, in a stack comprising a single silver layer, the intensity of the electric field and thus the absorption for the short wavelengths of the visible region corresponding to the blue is particularly high close to the substrate and very significantly decreases as the silver layer is approached. These short wavelengths are of the order of 400 to 450 nm.

To position the absorbent layer close to the substrate will not make it possible to obtain bluish hues in reflection.

On the other hand, if the absorbent layer is positioned close to the silver layer, the absorption in the blue-green part of the visible spectrum is lower and in particular relatively lower with respect to the absorption in the red.

To position the absorbent layer close to the silver layer as claimed makes it possible to obtain, in reflection, bluish hues and non-yellow colors and transmission.

III. Confirmation of the Results

III.1. Impact of the Position on the Thickness of Absorbent Layer to be Used

In order to confirm these results, simulations were carried out in order to determine, for the typical stack, what thicknesses have to be added according to the position of the absorbent layer in order to reduce the solar factor of the typical stack from 48.5% to approximately 44%.

The typical stack comprises, starting from the substrate, the sequence of following layers: $TiO_2$ (19.5 nm)/ZnO (5 nm)/Ag (178 nm)/Ti (0.3 nm)/ZnO (5 nm)/$TiO_2$ (16.5 nm)/SnZnO (10.5 nm)/$Si_3N_4$ (14 nm)/$TiO_2$ (1 nm).

The absorbent layer is based on NiCr.

| Position of the absorbent layer | NiCr thickness SF 48.5% => 44% |
|---|---|
| P1: Between the substrate and the 1st $TiO_2$ layer | 0.7 nm |
| P2: Between the $TiO_2$ and ZnO layers | 0.9 nm |
| P3: Between the ZnO and Ag layers | 1.1 nm |
| P4: Between the Ag and Ti layers | 1.0 nm |
| P5: Between the $TiO_2$ and SnZnO layers | 0.6 nm |

These results confirm that the necessary thickness of absorbent layer in order to achieve the same level of absorption is greater if the absorbent layer is placed close to the Ag layer (in comparison with close to the substrate).

Figure 2:
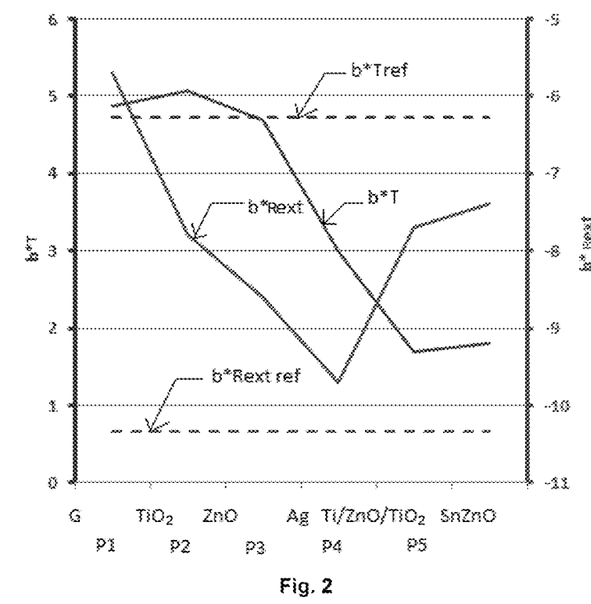
Figure 3:
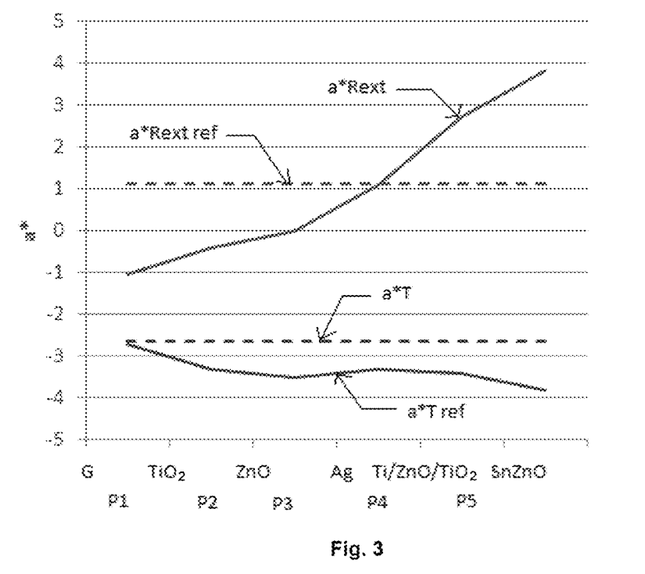

III.2. Impact of the Position on the Variation in the Colors on the Yellow-Blue and Red-Green Axes The influence of the position of the absorbent layer on the variation in the colors is illustrated by FIGS. 2 and 3. FIG. 2 illustrates the variations in the colors on the yellow-blue axis and FIG. 3 illustrates the variations in the colors on the red-green axis.

By virtue of appropriate software, it is possible to determine, as a function of the position of the absorbent layer in a typical stack described above (II.2), the Lab colors in transmission or in reflection. The thickness of the absorbent layer is chosen so that, whatever the position considered, the solar factor of the material fitted in a double glazing with the stack on face 2 is approximately 44%.

These figures respectively represent:

FIG. 2: the variations in the values of b*T and b*Rext as a function of the position of the absorbent layer in the typical stack, FIG. 3: the variations in the values of a*T and a*Rext as a function of the position of the absorbent layer in the typical stack.

In FIG. 2, the following are found:
on the abscissa: the different positions P1 to P5 (defined above) of the absorbent layer in the typical stack,
on the left-hand ordinate: the b*T values,
on the right-hand ordinate: the b*Rext values.

In FIG. 3, the following are found:
on the abscissa: the different positions P1 to P5 (defined above) of the absorbent layer in the typical stack,
on the ordinate: the a* values.

The dotted lines "b*Rext ref", "b*T ref", "a*Rext ref" and "a*T ref" respectively represent the b*Rext, b*T, a*Rext and a*T values of the typical (or reference) stack not comprising an absorbent layer.

The b*T, b*Rext, a*T and a*Rext curves respectively represent the b*T, b*Rext, a*T and a*Rext values as a function of the position of the absorbent layer in the stack.

The following observations may be made.

For the colors in reflection, whatever the position of the absorbent layer, its introduction results in a shift in the colors toward the yellow.

This is because, in FIG. 2, all the b*Rext values are greater than the b*Rext value of the typical stack (b*Rext ref). However, when the absorbent layer is placed at the claimed position (P2), this shift is less pronounced and makes it possible to remain with b*Rext values below −6.

The shift toward the yellow is much greater when the absorbent layer is placed in direct contact with the substrate and minimal when the absorbent layer is placed in direct contact with the silver layer.

FIG. 3 shows that the color in reflection expressed by the a* values is strongly impacted and varies significantly with the position of the absorbent layer. When the absorbent layer is placed in the P1, P2 or P3 positions, an advantageous shift toward the green is observed.

To place the absorbent layer at the claimed position makes it possible to clearly obtain a pair of a* and b* values in external reflection conferring a bluish hue.

For the colors in transmission, the introduction of the absorbent layer at the claimed position:
does not result in a significant shift in the colors on the yellow-blue axis (FIG. 2),
results in a slight shift toward the green in the colors on the red-green axis (FIG. 3).

It emerges from the pair a*T and b*T that an absence of shift toward the yellow and a shift toward the green are observed in transmission. To place the absorbent layer at the claimed position makes it possible to clearly obtain a pair of a* and b* values in transmission conferring a non-yellow, indeed even more neutral, hue.

III.3. Impact of the Position of the Absorbent Layer on the Interior and Exterior Reflection The influence of the position of the absorbent layer on the variation in the interior and exterior light reflection is illustrated by FIG. 4.

Figure 4:
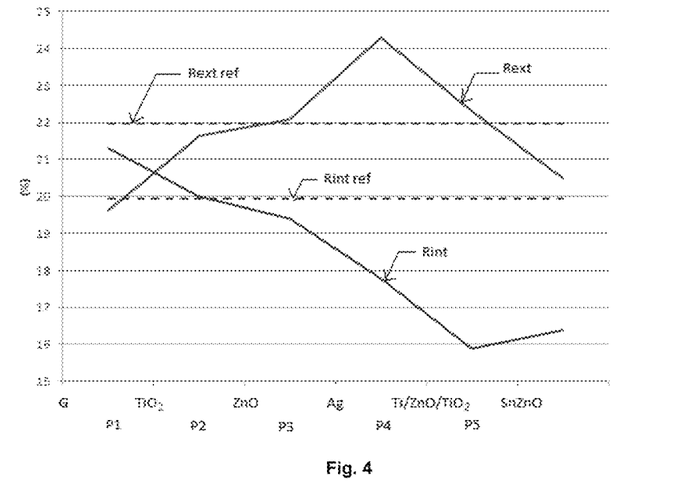

In FIG. 4, the following are found:
on the abscissa: the different positions P1 to P5 (defined above) of the absorbent layer in the typical stack,
on the ordinate: the light reflection values in %.

The dotted lines "Rext ref" and "Rint ref" respectively represent the Rext and Rint values of the typical (or reference) stack not comprising an absorbent layer.

The "Rext" and "Rint" curves respectively represent the Rext and Rint values as a function of the position of the absorbent layer in the stack.

To place the absorbent layer at the claimed position makes it possible to obtain both an interior and exterior reflection of less than 22%.

IV. "Solar Control" and Colorimetry Performance Qualities

Table 2 lists the materials and the physical thicknesses in nanometers (unless otherwise indicated) of each layer or coating which forms the stacks as a function of their positions with regard to the substrate carrying the stack (final line at the bottom of the table).

TABLE 2

|  | Comp. 1 | Inv. 1 | Inv. 2 | Inv. 3 | Inv. 4 |
|---|---|---|---|---|---|
| Protective layer: |  |  |  |  |  |
| $TiO_2$ | 1 | 1 | 1 | 1 | 0.5 |
| Coating |  |  |  |  |  |
| $Si_3N_4$ | 16.5 | 15.9 | 13.1 | 14.4 | 12 |
| SnZnO | — | — | — | — | 10 |
| $TiO_2$ | 20 | 20 | 20 | 20 | — |
| $TiO_2$—TiZrO | — | — | — | — | 17 |
| ZnO | 5 | 5 | 5 | 5 | 6 |
| Blocking layer |  |  |  |  |  |
| Ti | 0.3 | 0.3 | 0.3 | 0.3 | 0.2 |
| NiCr | — | — | — | — | — |
| Functional Ag layer | 18.6 | 17.7 | 17.2 | 16.9 | 16.8 |
| Coating |  |  |  |  |  |
| ZnO | 5 | 5 | 5 | 5 | 5 |
| $Si_3N_4$ | — | — | — | 5 | — |
| NiCr | — | 1.9 | — | 1.2 | 0.5 |
| TiN | — | — | 2.7 | — | — |
| $Si_3N_4$ | — | — | — | 5 | — |
| $TiO_2$ | 23 | 18.9 | 12.5 | 12.6 | 17.7 |
| NiCr | 1.2 | — | — | — | — |
| Glass substrate (mm) | 4 | 4 | 4 | 4 | 4 |

Table 3 below lists the main optical characteristics measured when the materials form part of a double glazing of structure: 4-16-4 (Ar—90%). The stack is positioned on face 2, the face 1 of the glazing being the outermost face of the glazing, as usual.

TABLE 3

Double glazing structure 4-16-4 (Ar-90%) fitted with the stack on face 2

|  | Target value | Comp. 1 | Inv. 1 | Inv. 2 | Inv. 3 | Inv. 4 |
|---|---|---|---|---|---|---|
| LT % | ≈60-70% | 60.3 | 60.2 | 67.5 | 64.8 | 67.2 |
| LRext % | <25 | 14.4 | 19 | 19.2 | 17.1 | 23.5 |
| LRint % | <25 | — | — | — | — | 21.4 |
| SF | <45 | 40.1 | 40 | 44.1 | 41.5 | 44.0 |
| S | >1.5 | 1.503 | 1.505 | 1.53 | 1.56 | 1.53 |
| a*T | <0 | −4.4 | −5.2 | −4.4 | −4.9 | −3.3 |
| b*T | <6 | 4.4 | 4.2 | 4.8 | 5 | 5.6 |
| a*Rext | <3 | 0.4 | 0.3 | 2.4 | 1.6 | 0.1 |
| b*Rext | <−6 | −4.2 | −7.9 | −8.4 | −10.3 | −5.2 |
| a*Rint | <3 | — | — | — | — | 2.4 |
| b*Rint | <−6 | — | — | — | — | −9.6 |

SF: solar factor; S: the selectivity; -: not determined.?

The comparative example Comp. 1 does not make it possible to obtain the bluish appearance desired. This is because, as explained above, the presence of the absorbent layer close to the substrate significantly absorbs the short visible wavelengths corresponding to the blue.

The examples according to the invention make it possible:
to retain the properties desired in terms of selectivity (S>1.5) and of exterior and interior reflection (<25%) and
to obtain the esthetic appearance desired with in particular neutral colors in transmission but especially the bluish appearance in exterior and interior reflection which is expressed by b*Rext values of markedly less than −6.

The invention claimed is:

1. A material comprising a transparent substrate coated with a stack of thin layers comprising, starting from the substrate:
   a lower coating comprising:
      at least one dielectric layer,
      at least one absorbent layer, which absorbs solar radiation in the visible part of the spectrum, exhibiting a thickness of between 0.2 and 9 nm,
      at least one dielectric layer,
   a single silver-based functional metal layer,
   optionally a blocking layer,
   an upper coating comprising at least one dielectric layer,
   optionally a protective layer,
   wherein:
   the at least one absorbent layer is separated from the substrate and from the silver-based functional layer by one or more dielectric layers,
   a thickness of all the dielectric layers interposed between the at least one absorbent layer and the silver-based functional metal layer is between 3 and 18 nm and wherein, when the material is fitted in a double glazing with the stack positioned on face 2, the double glazing exhibits:
      a selectivity of greater than 1.45,
      an interior and exterior light reflection of less than 25%,
      a value of b* in exterior reflection of less than −5,
      a value of b* in interior reflection of less than −5.

2. The material as claimed in claim 1, wherein the thickness of all the dielectric layers interposed between the at least one absorbent layer and the substrate is greater than 11 nm.

3. The material as claimed in claim 1, wherein the at least one absorbent layer is chosen from:
   metal layers based on a metal or on a metal alloy,
   metal nitride layers and
   metal oxynitride layers,
   of one or more elements chosen from palladium, niobium, tungsten, stainless steel, titanium, chromium, molybdenum, zirconium, nickel, tantalum or zinc.

4. The material as claimed in claim 1, wherein the lower coating comprises a dielectric layer based on zinc oxide located directly in contact with the silver-based metal layer.

5. The material as claimed in claim 1, wherein the lower coating comprises a high-index layer based on metal oxide exhibiting a refractive index of greater than 2.20 and a thickness of greater than 5 nm.

6. The material as claimed in claim 5, wherein the high-index layer based on metal oxide are chosen from titanium oxide or niobium oxide layers or layers of an alloy obtained from titanium and niobium.

7. The material as claimed in claim 1, wherein the lower coating comprises at least the sequence of layers deposited in the following order:
- at least one layer having a high refractive index, made of material with a refractive index of greater than or equal to 2.20, a physical thickness of the layer having a high refractive index or the sum of the physical thicknesses of the layers having a high refractive index being between 10 and 40 nm,
- at least one absorbent layer,
- at least one zinc oxide layer.

8. The material as claimed in claim 1, wherein the upper coating comprises at least one high-index layer based on metal oxide exhibiting a refractive index of greater than 2.20 and a thickness of greater than 5 nm.

9. The material as claimed in claim 1, wherein the upper coating comprises at least the sequence of thin layers deposited in the following order above the functional layer:
- at least one blocking layer,
- at least one layer based on zinc oxide,
- at least one layer having a high refractive index, made of material with a refractive index of greater than or equal to 2.20, a physical thickness of the layer having a high refractive index or the sum of the physical thicknesses of the layers having a high refractive index being between 10 and 40 nm,
- at least one dielectric layer exhibiting a refractive index of less than 2.20 and a thickness of greater than 5 nm located above the high-index layer.

10. The material as claimed in claim 1, wherein the substrate is made of glass or of a polymeric organic substance.

11. The material as claimed in claim 10, wherein the glass is a soda-lime-silica glass.

12. A multiple glazing comprising at least one material as claimed in claim 1 and at least one second substrate, the material and the second substrate are separated by at least one inserted gas-filled cavity.

13. The multiple glazing as claimed in claim 12, wherein the glazing is a double glazing exhibiting, with the stack positioned on face 2:
- a selectivity of greater than 1.45,
- an interior and exterior light reflection of less than 25%,
- a value of b* in exterior reflection b*Rext of less than −5,
- a value of b* in interior reflection b*Rint of less than −5.

14. The glazing as claimed in claim 12, wherein the glazing exhibits an interior and exterior light reflection of less than 24%.

15. The glazing as claimed in claim 12, wherein the glazing exhibits:
- a neutral color in transmission with a b*T of less than 6,
- a blue color in reflection with a b*Rext and a bRint of less than −6 and optionally an a*Rext and an a*Rint of less than 5.

* * * * *